Aug. 25, 1953  G. M. STEIN  2,650,356
PROTECTIVE DEVICE FOR TRANSFORMERS
Filed May 5, 1950  2 Sheets-Sheet 1

WITNESSES:

INVENTOR
Gerhard M. Stein.
BY
ATTORNEY

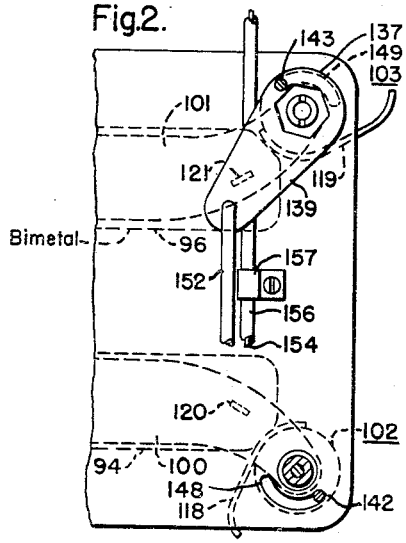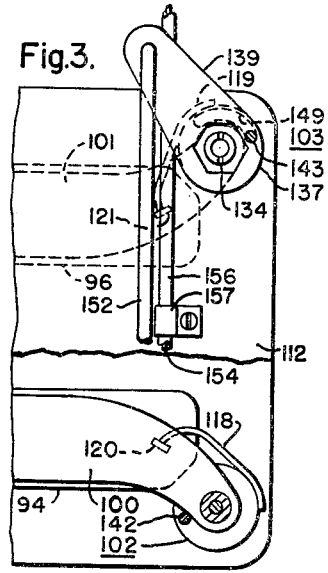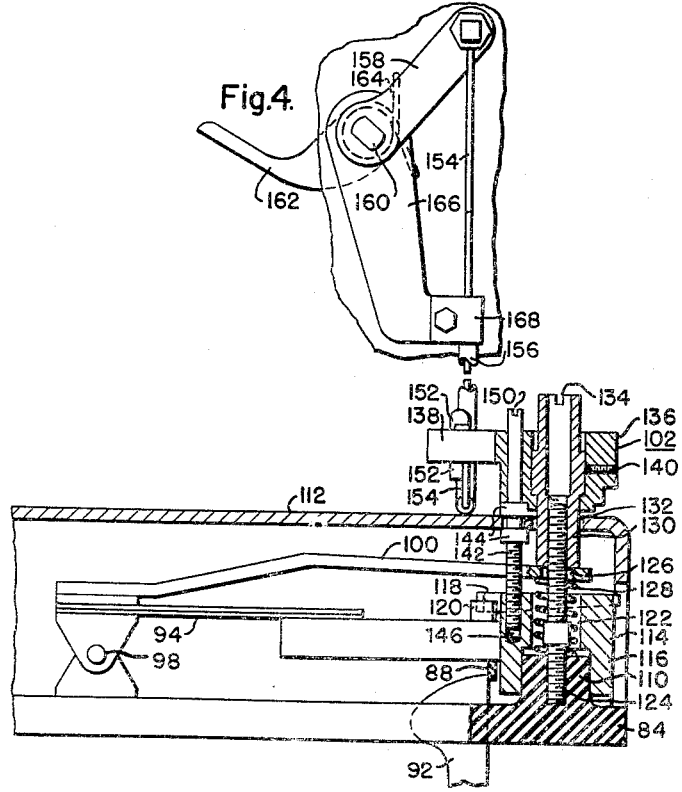

Patented Aug. 25, 1953

2,650,356

UNITED STATES PATENT OFFICE 2,650,356

PROTECTIVE DEVICE FOR TRANSFORMERS

Gerhard M. Stein, Sharon, Pa., assignor to Westinghouse Electric Corporation, East Pittsburgh, Pa., a corporation of Pennsylvania Application May 5, 1950, Serial No. 160,159

9 Claims. (Cl. 340—227)

This invention relates generally to protective devices for electrical apparatus and more particularly to protective devices for transformers.

In distribution systems, transformers and other apparatus are frequently so located that they must operate for months without inspection because of the difficulty and cost of making inspections. Recently a protective device has been developed for distribution transformers which will give a visible signal or indication of an abnormal operation of the transformer and will also interrupt the load circuit under predetermined load conditions. When only the visible signal is operated the load conditions should be changed or the transformer should normally be replaced by one of larger capacity. Such protective devices for transformers are described and claimed in Patent No. 2,223,830, issued December 3, 1940 to H. V. Putman which is assigned to the assignee of this invention.

Recently it has been found that in some instances it is more economical to continue operation of such distribution transformers under abnormal load conditions for limited periods of time than to replace the transformer or to change the load. For this purpose a recalibrating protective device has recently been developed, as disclosed and claimed in the copending application Serial No. 118,122 filed September 27, 1949, now abandoned, in the names of Leonard et al. and assigned to the assignee of this invention, which permits operation of the transformer at a higher level of operation while retaining the protective features of the Putman protective device.

The recalibrating protective device of the Leonard et al. application however requires a manual operation and necessitates the return of a service man to reset the calibrating device to restore the protective device to its initial setting after the emergency condition has passed. Often the service man forgets to thus reset the recalibrating device. If in the meantime, the load on the transformer drops and the transformer is cooled, it may then be subjected to a critical overload which by reason of the difference between the starting temperature of the transformer and the tripping temperature of the recalibrated protective device results in such a large winding temperature that the corresponding loss of life of the insulation becomes excessive before the recalibrated protective device is operated. It is therefore desirable to provide for removing the recalibration of the protective device as soon as the transformer is operating at its predetermined lower load level and to restore the protective device to its initial condition as soon as possible.

An object of this invention is to provide in a transformer having protective devices for indicating predetermined load levels, for recalibrating the protective devices to permit operation of the transformer at higher predetermined load levels and for resetting the calibration of the protective devices upon the occurrence of a predetermined lower load level.

Another object of this invention is to provide in a transformer having protective devices for indicating predetermined load levels and means for recalibrating the protective devices to permit operation of the transformer at higher predetermined load levels, for automatically changing or resetting the calibration upon the occurrence of a predetermined lower load level.

A further object of this invention is to provide in a transformer having protective devices for indicating predetermined load levels and means operable external of the casing for recalibrating the protective devices to permit operation of the transformer at higher predetermined load levels, means disposed for automatic operation upon the occurrence of a predetermined lower load level to simultaneously reset the calibration of the protective devices and to operate the externally operable means to a given position.

Other objects of this invention will become apparent from the following description when taken in conjunction with the accompanying drawings in which:

Fig. 2 is a plan view with parts broken away of the top of a portion of a protective device employed in the transformer of Fig. 1.

Fig. 3 is a plan view of the protective device of Fig. 2 with a part of the top thereof removed and the actuating members in a different latched position from that of Fig. 2, and Fig. 4 is a view in elevation and partly in section illustrating the recalibrating and resetting mechanism utilized in conjunction with the protective device in the transformer of Fig. 1.

Figure 1:
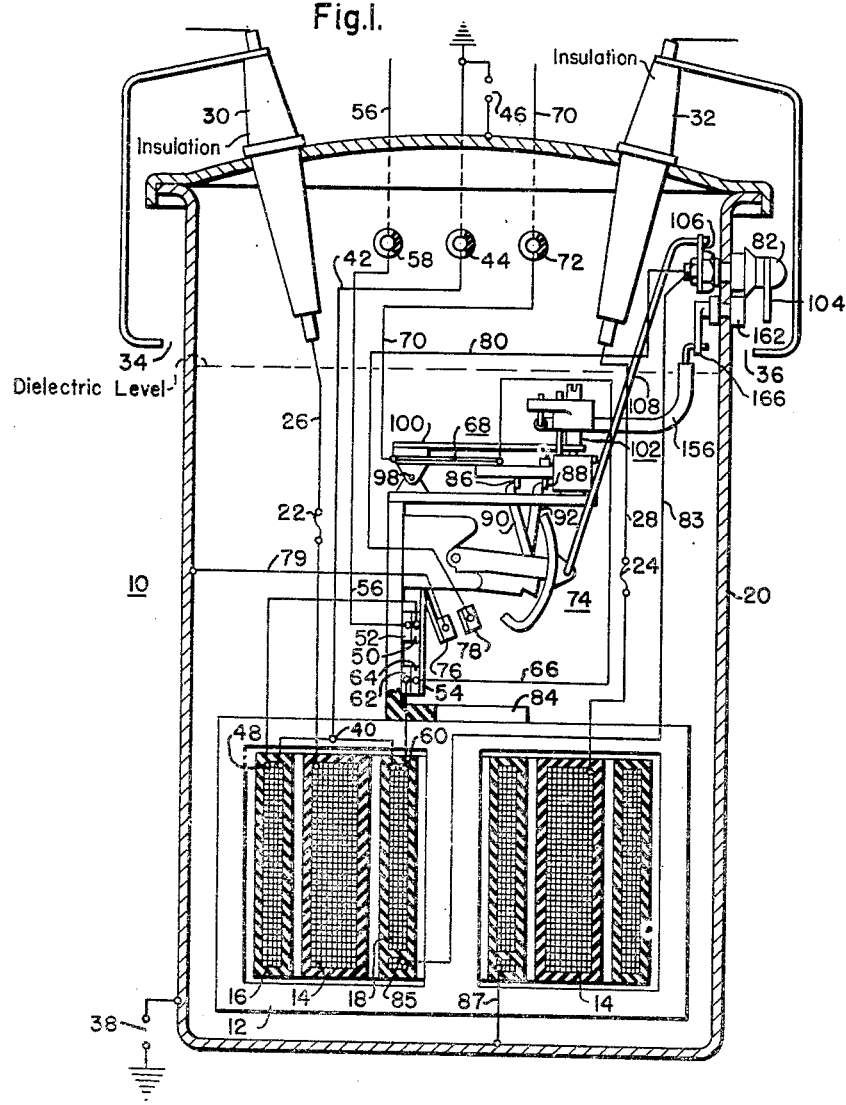
Figure 1 is a view partly in section and partly in side elevation of a transformer embodying the protective devices of this invention.

Referring to Fig. 1 of the drawings, there is illustrated a transformer 10 comprising a magnetic core 12 and a winding assembly including a primary or high voltage winding 14 and a secondary or low voltage winding having two parts 16 and 18 and a signal light secondary winding 85, the core and windings therefor being enclosed in a casing 20 containing a suitable fluid dielectric. Where the dielectric is a liquid, the casing 20 is usually filled to the level indicated in Fig. 1 to completely immerse the transformer components.

As illustrated, the high voltage winding 14 is connected through fuses 22 and 24 to circuit conductors 26 and 28, respectively, which extend through bushings 30 and 32, respectively, in the cover of the casing 20. Suitable spark gaps 34, 36 and 38 may be provided between conductors 26 and 28 and the casing 20, and between the casing 20 and ground in a well known manner to protect the apparatus by limiting the voltage that is permitted to build up between the several parts of the apparatus.

The low voltage winding parts 16 and 18 may have two of their terminals connected together as at 40 so that the two windings provide a continuous series connected winding, the midpoint 40 being connected by conductor 42 through a bushing 44 to ground, a spark gap 46 being provided between the conductor 42 and the casing 20. The outer terminal 48 of the series connected windings 16 and 18 is connected through contact members 50 and 52 of a circuit interrupter 54, and conductor 56 which extends through a bushing 58 to constitute one of the secondary or distribution load circuit conductors, the inner terminal 60 of the series connected windings 16 and 18 being connected through contact members 62 and 64 of the circuit interrupter 54, conductor 66, at least a portion of a bimetal control element 68 and conductor 70 which extends through a bushing 72 to constitute the other one of the secondary or distribution load conductors.

The circuit interrupter 54 constitutes a part of a protective device 74 of the general nature disclosed in Patent No. 2,169,586, issued August 15, 1939 to M. G. Leonard and assigned to the assignee of this invention. Thus the bimetal element 68 is disposed to control the actuation of the circuit interrupter 54 to an open circuit position upon the occurrence of predetermined load conditions. An auxiliary contact member 76 is also provided to be actuated into circuit closing position to engage a stationary contact member 78 to establish a signaling circuit upon a predetermined load less than the load necessary to operate the contact members 50 and 64. When the contact members 76 and 78 are in engagement a circuit is established extending from the grounded casing 20, through conductor 79, contact members 76 and 78, conductor 80 to a signal light 82, conductor 83, one end of an auxiliary signal light secondary winding 85 on the core 12, the other end of the secondary winding 85 and conductor 87 to the grounded casing 20 whereby a visible signal is given external of the casing 20.

In practice the bimetal member 68 illustrated in Fig. 1 as a single element, is pivotally secured at one end to a suitable base 84 of insulating material which also carries the circuit interrupter 54. The bimetal element 68 is provided with two spaced blocks 86 and 88 of insulating material disposed to be engaged by latch members 90 and 92, respectively, which control the release of the toggle mechanisms (not shown) for controlling movement of the contact members 76 and 64, respectively, of the circuit interrupter 54. As the bimetal element 68 is immersed in the dielectric and is also connected in circuit with the windings 16 and 18, it is evident that the bimetal is thermally responsive for movement to progressively release latches 90 and 92 in response to the cumulative effect of both the current flowing in the transformer circuit and the temperature of the dielectric within the casing 20 so that the bimetal element 68 is heated in accordance with a proportionate temperature differential characteristic as compared to that of the electrical conductor of the windings. This temperature-differential, sometimes called temperature-gradient, is the difference between the conductor temperature and the surrounding liquid dielectric.

As illustrated in Fig. 1, the bimetal element 68 may comprise a single element which carries the latch members 90 and 92 in spaced relation thereon, or as illustrated in Figs. 2, 3 and 4, the bimetal element 68 may comprise two extending legs 94 and 96 which carry the latch members 90 and 92, respectively, in the same manner as disclosed in the Leonard Patent No. 2,169,586. In either case, the bimetal element 68 is pivoted as shown at 98 in Figs. 1 and 4.

As illustrated in Fig. 1 the bimetal element 68 is provided with an arm 100 mounted at one end thereof and extending in the same general direction as the bimetal element. The arm 100 is disposed to have pressure applied to the free end thereof whereby the position of the arm 100 and consequently the position of the bimetal element 68 is adjusted about the pivot 98 to control or determine the deflection of the bimetal element necessary to progressively release the latches 90 and 92. For this purpose an adjusting device 102, to be described hereinafter, is disposed adjacent the free ends of the bimetal element 68 and the arm 100.

In order to reset the circuit interrupter or to manually operate it to any one of close or reset positions, a handle 104 is mounted external of the casing 20 disposed for operation to actuate a lever 106 within the casing, the lever 106 being mechanically connected to the circuit interrupter by a connecting rod 108. In practice, the handle 104 is part of an operating assembly in which the signal light 82 is disposed in a visible position, the assembly being mounted to extend through a suitable opening in the casing 20 and to be secured to the lever 106 whereby movement of the handle 104 will actuate the lever. Thus by rotating the handle 104, the latches 90 and 92 may be moved into engagement with the lugs or blocks 86 and 88, respectively, to control the resetting of the circuit interrupter 54.

As will be appreciated, the length of the latches 90 and 92 and/or the size of the blocks 86 and 88, respectively, are predetermined for controlling the progressive release of the latches 90 and 92 as the bimetal element 68 is deflected when loaded in a predetermined manner through the arm 98. Thus the bimetal element is initially loaded by adjusting the adjustable device 102, to be described hereinafter, so that for a predetermined load and oil temperature of the transformer, the bimetal element 68 deflects sufficiently to release the latch 90 whereby contact members 76 and 78 are actuated into engagement to close the circuit from the secondary winding 85 to cause a lighting of the signal light 82 whereby a visible indication is given external of the casing that a predetermined load condition has existed or is still in existence on the transformer 10. When this condition which may be the result of a heavy load for a short period of time or a light load for a longer period of time, is observed, the load should be changed or a transformer of required capacity should be substituted for the transformer than being used. After the load is changed or a report made, if the load condition which caused the lighting of the signal is no longer present, the latch 90 may be reset by operating the handle 104 to thereby remove the signal.

If the load condition is such as to deflect the bimetal element 68 sufficient to trip both of the latches 90 and 92, in addition to the signal light being lighted, the circuit interrupter 54 is actuated whereby contact members 64 and 59 are moved to the open circuit position to interrupt the transformer circuit.

In practice, it is often found to be impossible or inexpedient to replace an overload transformer immediately with the result that under certain overload conditions the protective device 74 operates to maintain an interruption of the transformer circuit regardless of the manipulation of the handle 104 to reset the latches 90 and 92. When this occurs, it has been found to be desirable to arrange to maintain the transformer in service even though some deterioration of insulation is encountered instead of interrupting the service.

The adjustable device 102 illustrated schematically in Fig. 1 and in detail in Fig. 4 functions to effect the recalibration of the bimetal element 68 to thereby permit operation of the transformer under certain overload conditions while retaining the protective features referred to. As illustrated in Fig. 4, the adjustable device 102 comprises a plurality of cooperating elements disposed for movement about a boss 110 which is carried by the base 84 adjacent the end of the bimetal element 68. In the embodiment of Figs. 2, 3 and 4, adjustable devices 102 and 103 are associated with the bimetal legs 94 and 96, respectively, of the bimetal element 68, each bimetal leg also having an arm 100 and 101, respectively, extending in the general direction of the corresponding leg but having the end turned slightly out of alignment with the corresponding leg as shown in Figs. 2 and 3 so as to clear the ends of the bimetal legs and cooperate with the adjustable devices 102 and 103.

The adjustable devices 102 and 103 are identical as to components thereof although positioned slightly different with respect to the arms 100 and 101, respectively. For the purpose of describing the devices 102 and 103 reference may be had to the detailed view of the adjustable device 102 in Fig. 4 which also illustrates the relative positioning of the adjustable device with respect to the arm 100 and the cover 112 for the bimetal element assembly. The adjustable device 102 comprises a cylindrical member 114 having a depending annular flange 116 about its base for slidably seating the cylindrical member 114 on the boss 110. Adjacent the upper end of the cylindrical member 114 there is disposed a pawl 118 which extends outwardly therefrom for engaging a lug 120 carried on the end of the bimetal leg 94 under predetermined operating conditions to be described hereinafter.

The cylindrical member 114 is provided with a central bore 122 for receiving a stud screw 124, the lower end of which is in threaded engagement in the boss 110. The end of the arm 100 is provided with an enlarged opening 126 through which the upper end of the stud screw 124 extends to permit movement of the end of the arm 100 relative to the stud screw 124. In order to apply a force upwardly of the arm 100 to tend to always return the arm and consequently the bimetal leg 94 to a given position, a helical spring 128 is disposed within the bore 122 about the stud screw 124 to be seated under compression between the upper end of the boss 110 and the end of the arm 100.

In order to provide for adjusting the position of the arm 100 about the pivot 98 and consequently calibrate the bimetal leg 94 so as to calibrate the amount of overlap between the lug 98 and the end of the latch 92 to control the amount of deflection of the bimetal necessary to release the latch 92, a pressure member 130 of cylindrical shape is disposed to extend through a suitable opening 132 in the cover 112 and to have its lower end in threaded engagement with the upper end of the stud screw 124 and in seating engagement with the end of the arm 100. The upper end of the pressure member 130 is notched as at 134 for receiving a screw driver (not shown) for turning the pressure member 130 relative to the stud screw 124 for initially adjusting the pressure applied to the end of arm 100 in opposition to the force of the spring 128. The pressure member 130 carries an annular member 136 disposed thereabout above the cover 112, the annular member 136 being provided with lever arm 138 extending outwardly therefrom, the purpose of which will be explained more fully hereinafter.

When initially installed or at any time it is desired to effect a major adjustment or calibration of the bimetal elements, the pressure member 130 of each of the devices 102 and 103 is adjusted as described by turning it relative to the stud screw 124 after which the annular member 136 is secured to the pressure member 130 in any suitable manner, such as by the set screw 140 so that movement thereafter of the annular member 136 will effect movement of the pressure member 130 to recalibrate the bimetal element as will be described hereinafter.

In order to adjust the relative position or amount of engagement of the end of the pawl 118 with the lug 120 to be referred to hereinafter, an adjusting screw 142 is disposed to be positioned through the cover 112, being held in position with respect thereto by suitable flange collars 144 on opposite sides of an arcuate slot or opening 148 in the cover 112, the lower end of the adjusting screw 142 being in threaded engagement with a tapped hole 146 in the cylindrical member 114 and the upper end extending through a suitable opening in the annular member 136 as illustrated in Figs. 4 and 2. The upper end of the adjusting screw 142 terminates above the annular member 136 and is provided with a slot 150 for receiving a screw driver (not shown) for turning the screw 142 to raise or lower the cylindrical member 114 and thus control the amount of overlap or engagement between the end of the pawl 118 and the lug 120 during a predetermined operation of the adjusting device 102.

The adjusting devices 102 and 103 are identical as to the components but have the components positioned slightly different as will be apparent from Figs. 2 and 3 so that when the arms 138 and 139, respectively, are in the same position relative to one another, the pawls 118 and 119, respectively, are in different positions for cooperating to simultaneously engage the lugs 120 and 121, respectively, under predetermined operating conditions. The adjusting screws 142 and 143 of the devices 102 and 103, respectively, are likewise positioned together with the slots 148 and 149, respectively, in different positions whereby the pawls 118 and 119, respectively, may be actuated for movement without interference.

In order to effect simultaneous movement of the adjusting devices 102 and 103 where the pair of bimetal legs 94 and 96 are employed, the ends of the arms 138 and 139 are connected together by a tie rod 152, as illustrated in Figs. 2, 3 and 4, the tie rod 152 having turned ends for fitting into suitable openings in the arms 138 and 139. For the purpose of actuating the arms to effect movement of the pressure member 130 and its counterpart in the device 103, the arm 138 is connected to the end of a pull rod 154 disposed in a protective sleeve 156 which is held in position by a clip 157 secured to the cover 112, the other end of the pull rod 154 being connected to a lever 158, illustrated in Figs. 1 and 4, which is carried by a shaft 160 extending through the casing 20 in close proximity to the operating lever 104, the outer end of the shaft 160 carrying an operating or control handle 162 so shaped as to normally fit and be positioned adjacent to the handle 104.

In order to effect an automatic return of the adjusting devices 102 and 103 to an initial position upon the occurrence of predetermined operating conditions, a torsion spring 164 is disposed about the shaft 160 as illustrated in Fig. 4, one end of the spring being hooked over the edge of a fixed bracket arm 166, the lower end of which constitutes a guide 168 for the pull rod 154, and the other end of the spring 164 is hooked over the upper edge of the lever 158 to apply a force thereto when the handle 162 is actuated to the position shown, to tend to bias the handle 162 and pull rod 154 in a direction to simultaneously move the adjusting devices 102 and 103 to the position represented in Fig. 2.

In practice, when the signal light 82 indicates an undesirable load condition as described hereinbefore and it is desired to continue to operate the transformer under such load conditions, the auxiliary handle 162 is moved to the position shown in Fig. 4, whereby the torsion spring 164 is loaded and the pull rod 154 effects simultaneous movement of the arms 138 and 139 of the adjusting devices 102 and 103, respectively, and consequently the annular members 136 and 137 and pressure members 130 secured thereto, from the position shown in Fig. 2 to the position shown in Figs. 3 and 4 in which pressure is applied to the arms 100 and 101, respectively, to recalibrate the bimetal legs 94 and 96 by turning them somewhat about the pivot 98 whereby a greater deflection of the bimetal element 68 of Fig. 1 or bimetal legs 94 and 96 of Fig. 2 is necessary to release the latches 90 and 92. At the same time, when the annular members 136 and 137 are moved, the adjusting screws 142 and 143, respectively, are moved in the arcuate slots 148 and 149, respectively, in the cover 112 to effect a rotation of the cylindrical member 114 and its counterpart of the device 103 and thereby actuate the pawls 118 and 119, respectively, from the positions shown in Fig. 2 to the positions shown in Figs. 3 and 4 whereby the ends of the pawls 118 and 119 engage the lugs 120 and 121, respectively, to maintain the adjusting devices 102 and 103 in the recalibrated position.

When the adjusting devices 102 and 103 are thus moved and maintained in position to recalibrate the bimetal legs 94 and 96, it is evident that higher overloads can be carried by the transformer for longer periods of time before the latch 92 is released to interrupt the transformer circuit. Even when so recalibrated, the protective device 74 will operate to give short-circuit protection since the bimetal element 68 of Fig. 1 or the bimetal legs 94 and 96 are connected in the secondary winding circuit and are responsive to the current flowing therein as well as the temperature of the dielectric. The bimetal element 68 or the bimetal legs 94 and 96 thus function to first release the latch 90 to effect a lighting of the signal light 82 and to thereafter release latch 92 to interrupt the transformer circuit, the successive operations being dependent upon the calibration or setting of the bimetal elements.

With the adjusting devices 102 and 103 latched in position as illustrated in Figs. 3 and 4 and described hereinbefore, the recalibration of the bimetal element is effective as long as the abnormal load condition exists. When the emergency is over, the temperature of the dielectric decreases and the current flow through the bimetal is lowered whereby the bimetal legs 94 and 96 are deflected to a position where the lugs 120 and 121 disengage the pawls 118 and 119, respectively, and the force of the torsion spring 164 returns the arms 138 and 139, respectively, and the adjusting devices 102 and 103, respectively, to the positions illustrated in Fig. 2. In this position the recalibrating pressure is released from the arms 100 and 101 and the bimetal legs 94 and 96 are moved about their pivots 98 to their initially calibrated position. As explained hereinbefore, the release of the pawls 118 and 119 can be readily adjusted by adjusting the screws 142 and 143, respectively, to adjust the degree of engagement between the lugs 120 and 121, respectively, and the pawls 118 and 119.

This invention thus makes it possible to provide protection for a transformer under both normal and emergency operating conditions while automatically adjusting the degree of protection when an emergency condition of operation no longer exists. It will of course be appreciated that the apparatus of this invention is formed of standard components and can be readily reproduced by anyone skilled in the art. Many modifications thereof are possible without departing from the spirit and scope of the invention.

I claim as my invention:

1. In combination, an electrical transformer comprising a casing, a fluid dielectric therein, current-carrying insulated electrical-conductor coils immersed in the dielectric, thermally responsive means disposed within the dielectric to be responsive to the temperature occasioned by the operation of the transformer, means visible exteriorly of the casing for indicating a predetermined maximum temperature indication of the thermally responsive means while the transformer is in useful operation, means external of the casing disposed for operation to adjust the thermally responsive means within the casing whereby the means visible externally of the casing indicates a predetermined higher maximum-temperature indication of the thermally responsive means while the transformer is in useful operation, and means coperating with the thermally responsive means and said external adjusting means and responsive to a predetermined decrease from said predetermined higher maximum-temperature indication to automatically release said externally adjusting means whereby the means visible externally of the casing again indicates the predetermined maximum-temperature indication of the thermally responsive means while the transformer is in useful operation.

2. In combination, an electrical transformer comprising a casing, a fluid dielectric therein, current-carrying insulated electrical-conductor coils immersed in the dielectric, thermally responsive means disposed within the dielectric to be responsive to the temperature occasioned by the operation of the transformer, means visible exteriorly of the casing for indicating a predetermined maximum-temperature indication of the thermally responsive means while the transformer is in useful operation, adjusting means for the thermally responsive means, means external of the casing disposed for operation to actuate the adjusting means in a predetermined manner to recalibrate the thermally responsive means whereby the means visible externally of the casing indicates a predetermined higher maximum-temperature indication of the thermally responsive means while the transformer is in useful operation, and means cooperating with the thermally responsive means and the external operating means disposed for operation upon a predetermined decrease from said predetermined higher maximum temperature indication to effect the operation of the external operating means to actuate the adjusting means in a manner opposite to said predetermined manner to so change the recalibration of the thermally responsive means that the means visible externally of the casing again indicates the predetermined maximum-temperature indication of the thermally responsive means while the transformer is in useful operation.

3. In combination, an electrical transformer comprising a casing, a fluid dielectric therein, coils immersed in the dielectric, thermally responsive means disposed within the dielectric to be responsive to the temperature occasioned by operation of the transformer, means visible exteriorly of the casing for indicating the existence of a predetermined initial temperature of the thermally responsive means while the transformer is in useful operation, circuit-interrupting means responsive to a following predetermined higher temperature of the thermally responsive means for disconnecting the electrical transformer from useful operation, adjusting means for the thermally responsive means, means external of the casing disposed for operation to actuate the adjusting means to recalibrate the thermally responsive means whereby the means visible exteriorly of the casing is thereafter responsive to indicate the existence of a predetermined higher initial temperature of the thermally responsive means while the transformer is in operation and the circuit-interrupting means is thereafter responsive to another later and higher predetermined temperature to disconnect the transformer from useful operation, and means cooperating with the thermally responsive means and the external operating means disposed for operation upon a predetermined decrease from said predetermined higher initial temperature to effect the operation of the external operating means to actuate the adjusting means to change the recalibration of the thermally responsive means in the opposite sense whereby the means visible externally of the casing again indicates the initial predetermined temperature of the thermally-responsive means while the transformer is in useful operation and the circuit-interrupting means is again responsive to said following predetermined higher temperature of the thermally responsive means for disconnecting the electrical transformer from useful operation.

4. In combination, an electrical transformer comprising a casing, a fluid dielectric therein, coils immersed in the dielectric, thermally responsive means disposed within the dielectric to be responsive to the temperature occasioned by the operation of the transformer, contact means operable in response to a predetermined initial temperature of the thermally responsive means to give a visible signal exteriorly of the casing while the transformer is in useful operation, circuit-interrupting means responsive to a following predetermined higher temperature of the thermally responsive means for disconnecting the electrical transformer from useful operation, means external of the casing connected to the contact means and the circuit-interrupting means disposed for operation to reset the contact means and the circuit-interrupting means when the temperature of the thermally responsive means is below the predetermined initial temperature, adjusting means for the thermally responsive means, manually operable means external of the casing disposed to be operated to actuate the adjusting means to recalibrate the thermally responsive means whereby the contact means is then responsive to indicate the existence of a predetermined higher initial temperature of the thermally responsive means while the transformer is in operation and the circuit-interrupting means is thereafter responsive to another later and higher predetermined temperature to disconnect the transformer from useful operation, and means cooperating with the thermally responsive means and the external manually operable means disposed for operation upon a predetermined decrease from said predetermined higher initial temperature to effect the automatic operation of the external manually operable means to actuate the adjusting means to its initial position to change the calibration of the thermally responsive means to the initial value thereof whereby the contact means is again operable in response to the predetermined initial temperature of said thermally responsive means and the circuit-interrupting means is again responsive to the following predetermined higher temperature of the thermally responsive means.

5. In a transformer having a casing containing coils immersed in a dielectric, the combination comprising, contact means disposed to be operated to give a visible signal exteriorly of the casing while the transformer is in useful operation, circuit-interrupting means disposed for operation to disconnect the transformer from useful operation, thermally responsive means disposed within the dielectric to be responsive to the temperature occasioned by the operation of the transformer, means carried by the thermally responsive means for releasably holding the contact means and the circuit-interrupting means in predetermined positions until predetermined sequential temperatures occur, means external of the casing disposed for operation to reset the contact means and the circuit-interrupting means when the temperature of the thermally responsive means is below said predetermined sequential temperatures, adjusting means for the thermally responsive means, manually operable means external of the casing disposed to be operated to actuate the adjusting means to recalibrate the thermally responsive means to hold the contact means and the circuit-interrupting means in said predetermined positions until predetermined higher sequential temperatures occur, spring means associated with said manually operable means disposed to bias the adjusting means from the recalibrated position to the initial position, and means cooperating with the thermally responsive means and the adjusting means disposed for operation upon a predetermined decrease from said predetermined higher sequential temperatures to release the biasing force of said spring means to operate the adjusting means from the recalibrated position to the initial position whereby the thermally responsive means is again operative to releasably hold the contact means and the circuit-interrupting means in predetermined positions until said predetermined sequential temperatures again occur.

6. In a transformer having a casing containing coils immersed in a dielectric, the combination comprising, contact means disposed to be operated to give a visible signal exteriorly of the casing while the transformer is in useful operation, circuit-interrupting means disposed for operation to disconnect the transformer from useful operation, thermally responsive means disposed within the dielectric to be responsive to the temperature occasioned by the operation of the transformer, spring means disposed for movement to adjust the calibration of the thermally responsive means, means carried by the thermally responsive means for releasably holding the contact means and the circuit-interrupting means in predetermined positions until predetermined sequential temperatures occur, means external of the casing disposed for operation to reset the contact means and the circuit-interrupting means when the temperature of the thermally responsive means is below said predetermined sequential temperatures, manually operable means external of the casing disposed to be operated from an initial position to effect movement of the spring means in a given direction to recalibrate the thermally responsive means to hold the contact means and the circuit-interrupting means in said predetermined positions until predetermined higher sequential temperatures occur, another spring means associated with the manually operable means disposed to bias the manually operable means to its said initial position and thereby move the recalibrating spring means in a direction opposite to said given direction, a catch carried by the thermally responsive means, and means cooperating with the thermally responsive means and the manually operable means disposed to be held by the catch when the thermally responsive means is recalibrated to the predetermined higher sequential temperatures and to be released thereby upon a predetermined decrease from said predetermined higher sequential temperatures, said cooperating means when released permitting the biasing force of said another spring means to operate the manually operable means to its said initial position whereby the thermally responsive means is again operative to releasably hold the contact means and the circuit-interrupting means in predetermined positions until said predetermined sequential temperatures again occur.

7. In combination, an electrical transformer comprising a casing, a fluid dielectric therein, current-carrying insulated electrical-conductor coils immersed in the dielectric, thermally responsive means disposed within the dielectric to be responsive to the temperature occasioned by the operation of the transformer, self-locking means visible exteriorly of the casing for indicating a predetermined maximum-temperature indication of the thermally responsive means while the transformer is in useful operation, a spring arm disposed for movement to adjust the thermally responsive means, adjusting means disposed to be rotated to effect movement of the spring arm, a lug carried by the thermally responsive means, a pawl disposed for movement with the adjusting means to engage the lug upon predetermined movement of the adjusting means, means external of the casing disposed for operation to rotate the adjusting means and thereby effect movement of the spring arm to adjust the thermally responsive means and simultaneously therewith move the pawl to engage the lug whereby the self-locking means visible externally of the casing indicates a predetermined higher maximum-temperature indication of the thermally responsive means while the transformer is in useful operation, the lug cooperating with the pawl to release the pawl when the thermally responsive means moves in response to a predetermined decrease from said predetermined higher maximum-temperature indication, and spring means disposed to effect movement of the adjusting means when the lug releases the pawl to again effect adjustment of the thermally responsive means whereby the self-locking means visible externally of the casing again indicates the predetermined maximum-temperature indication of the thermally responsive means while the transformer is in useful operation.

8. In combination, an electrical transformer comprising a casing, a fluid dielectric therein, current-carrying insulated electrical-conductor coils immersed in the dielectric, thermally responsive means disposed within the dielectric to be responsive to the temperature occasioned by the operation of the transformer, self-locking means visible exteriorly of the casing for indicating a predetermined maximum-temperature indication of the thermally responsive means while the transformer is in useful operation, a spring arm disposed for movement to adjust the thermally responsive means, adjusting means disposed to be rotated to effect movement of the spring arm, a lug carried by the thermally responsive means, a pawl disposed for movement with the adjusting means to engage the lug upon predetermined movement of the adjusting means, means external of the casing disposed for operation to rotate the adjusting means and thereby effect movement of the spring arm to adjust the thermally responsive means and simultaneously therewith move the pawl to engage the lug whereby the self-locking means visible externally of the casing indicates a predetermined higher maximum-temperature indication of the thermally responsive means while the transformer is in useful operation, the lug cooperating with the pawl to release the pawl when the thermally responsive means moves in response to a predetermined decrease from said predetermined higher maximum temperature indication, spring means disposed to effect movement of the adjusting means when the lug releases the pawl to again effect adjustment of the thermally responsive means whereby the self-locking means visible externally of the casing again indicates the predetermined maximum-temperature indication of the thermally responsive means while the transformer is in useful operation, and spring means cooperating with the means external of the casing to effect a movement thereof when the lug releases the pawl to rotate the adjusting means to effect adjustment of the thermally responsive means in the opposite direction whereby the self-locking means visible externally of the casing again indicates the predetermined maximum-temperature indication of the thermally responsive means while the transformer is in useful operation.

9. In combination, an electrical transformer comprising a casing, a fluid dielectric therein, coils immersed in the dielectric, thermally responsive means disposed within the dielectric to be responsive to the temperature occasioned by operation of the transformer, means visible exteriorly of the casing for indicating the existence of a predetermined initial temperature of the thermally responsive means while the transformer is in useful operation, circuit-interrupting means responsive to a following predetermined higher temperature of the thermally responsive means for disconnecting the electrical transformer from useful operation, means responsive to predetermined movements of the thermally responsive means in one direction to effect the operation of said means visible exteriorly of the casing and the circuit-interrupting means, adjusting means for the thermally responsive means, means external of the casing disposed for operation to actuate the adjusting means to recalibrate the thermally responsive means whereby the means responsive to predetermined movements of the thermally responsive means in one direction is operative to effect operation of the means visible exteriorly of the casing and the circuit-interrupting means at predetermined higher temperatures of the thermally-responsive means, means disposed for operation to actuate the adjusting means to remove the recalibration of the thermally responsive means, and means responsive to a predetermined movement of the thermally responsive means in the other direction to effect operation of said last actuating means whereby the means visible externally of the casing again indicates the initial predetermined temperature of the thermally-responsive means while the transformer is in useful operation and the circuit-interrupting means is again responsive to said following predetermined higher temperature of the thermally responsive means for disconnecting the electrical transformer from useful operation.

GERHARD M. STEIN.

References Cited in the file of this patent
UNITED STATES PATENTS

| Number | Name | Date |
| --- | --- | --- |
| 2,223,531 | Putnam | Dec. 3, 1940 |
| 2,489,906 | Kuhn | Nov. 29, 1949 |